United States Patent
Padmanaban et al.

(10) Patent No.: US 8,738,701 B2
(45) Date of Patent: May 27, 2014

(54) ARBITRATION OF DISK OWNERSHIP IN A STORAGE POOL

(75) Inventors: Sai Sudhir Anantha Padmanaban, Redmond, WA (US); Vyacheslav Kuznetsov, Sammamish, WA (US); Alan Warwick, Bellevue, WA (US); Andrea D'Amato, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 100 days.

(21) Appl. No.: 13/407,428

(22) Filed: Feb. 28, 2012

(65) Prior Publication Data

US 2013/0227009 A1    Aug. 29, 2013

(51) Int. Cl.
G06F 15/16    (2006.01)

(52) U.S. Cl.
USPC .......................................... 709/204

(58) Field of Classification Search
USPC ......................... 709/204, 208, 220
See application file for complete search history.

(56) References Cited

U.S. PATENT DOCUMENTS

| | | | |
|---|---|---|---|
| 6,178,529 B1 | 1/2001 | Short et al. | |
| 6,279,032 B1 | 8/2001 | Short et al. | |
| 6,954,881 B1 | 10/2005 | Flynn, Jr. et al. | |
| 6,965,936 B1 | 11/2005 | Wipfel et al. | |
| 7,260,678 B1 * | 8/2007 | Agarwal et al. | 711/112 |
| 7,631,066 B1 | 12/2009 | Schatz et al. | |
| 7,774,469 B2 | 8/2010 | Massa et al. | |
| 2003/0065782 A1 * | 4/2003 | Nishanov et al. | 709/226 |
| 2005/0132154 A1 | 6/2005 | Rao et al. | |
| 2009/0327798 A1 | 12/2009 | D'Amato et al. | |
| 2010/0057923 A1 | 3/2010 | Petter et al. | |
| 2010/0077249 A1 | 3/2010 | Das et al. | |
| 2011/0179231 A1 | 7/2011 | Roush | |
| 2011/0252270 A1 | 10/2011 | Abraham et al. | |

OTHER PUBLICATIONS

Vogels, et al., "The Design and Architecture of the Microsoft Cluster Service—A Practical Approach to High-Availability and Scalability", In Proceedings of 28th International Symposium on Fault-Tolerant Computing, Jun. 23-25, 1998, pp. 422-431.

* cited by examiner

*Primary Examiner* — Larry Donaghue
*Assistant Examiner* — Marshall McLeod
(74) *Attorney, Agent, or Firm* — Henry Gabryjelski; David Andrews; Micky Minhas

(57) ABSTRACT

The present invention extends to methods, systems, and computer program products for implementing persistent reservation techniques for establishing ownership of one or more physical disks. These persistent reservation techniques can be employed to determine ownership of physical disks in a storage pool as well as in any other storage configuration. Using the persistent reservation techniques of the present invention, when a network partition occurs, a defender of a physical disk does not remove a challenger's registration key until the defender receives notification that the challenger is no longer in the defender's partition. In this way, pending I/O from applications executing on the challenger will not fail due to the challenger's key being removed until the proper ownership of the physical disk can be resolved.

20 Claims, 14 Drawing Sheets

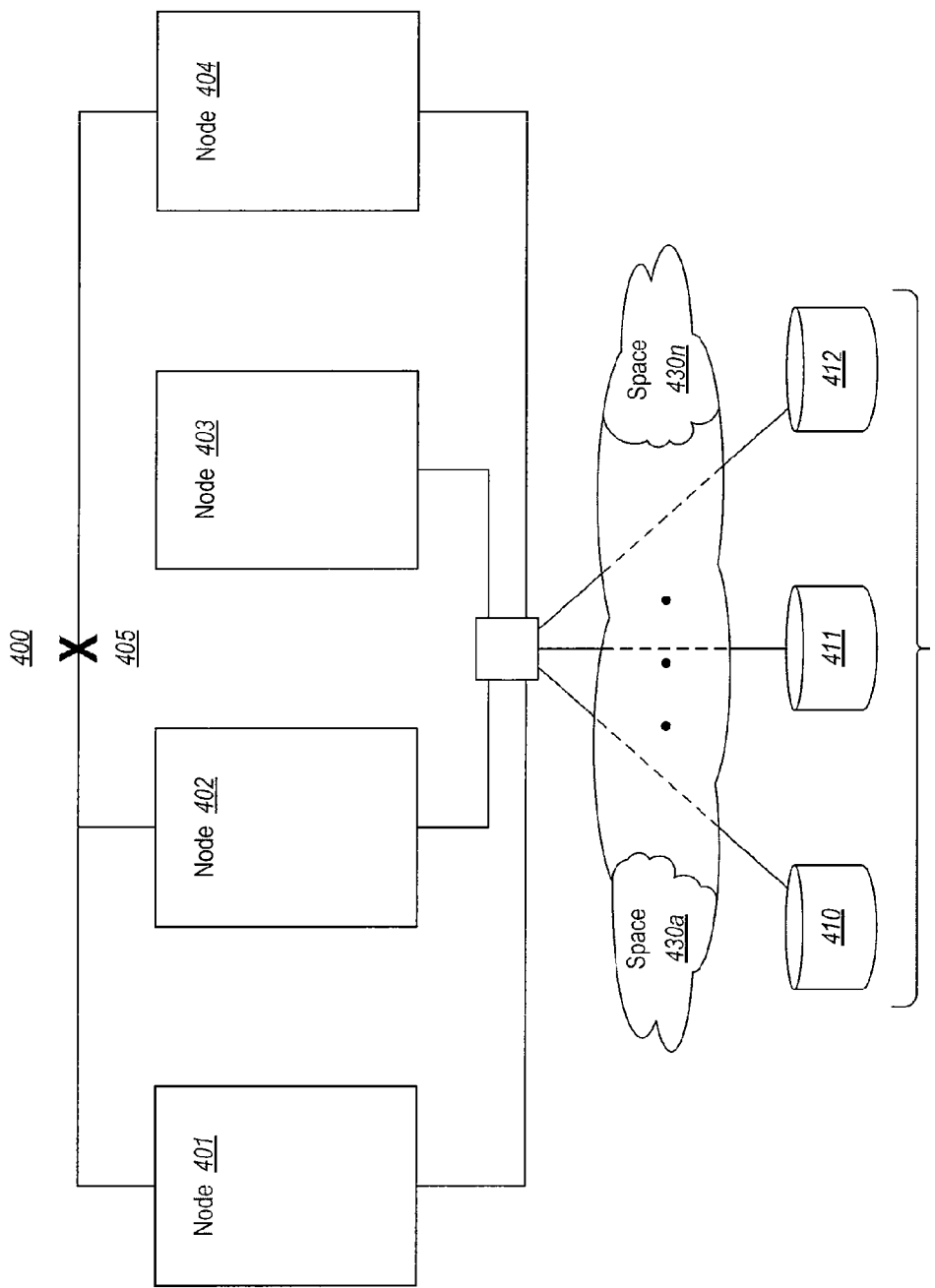

700

701

After A Network Partition That Prevents The First Node From Communicating With Another Node In The Cluster, And Prior To The First Node Being Notified Of The Network Partition, The First Node Detects That Another Node In The Cluster Has Attempted To Reserve The Storage Device Shared By Nodes Of The Cluster, The Detection Comprising Identifying That The Other Node Has Changed The Other Node's Registration Key In A Registration Data Structure

702

The First Node Changes The First Node's Registration Key, Registers The Changed Registration Key In The Registration Data Structure, And Reserves The Changed Registration Key In The Reservation Data Structure

*Figure 7*

ARBITRATION OF DISK OWNERSHIP IN A STORAGE POOL

CROSS-REFERENCE TO RELATED APPLICATIONS

Not Applicable.

BACKGROUND

1. Background and Relevant Art

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. Accordingly, the performance of many computing tasks is distributed across a number of different computer systems and/or a number of different computing environments.

Clustering refers to the grouping of multiple computer systems, referred to herein as nodes. Oftentimes, a cluster employs shared storage to enable applications executing on any of the nodes to access the same data. Shared storage enables fail over of applications from node to node in the cluster. For example, if a node fails, the applications executing on the failed node can be switched over to another node where they continue executing. Because the data used by the failed over applications is stored on a shared storage accessible from any node, the applications can continue to execute (e.g. access the same data) after being switched to another node. In this way, the failover is essentially transparent from a user's perspective.

To implement a cluster, it is necessary to maintain consistency across nodes. For example, cluster configuration data should remain consistent across nodes even though each node has access to the configuration data. As long as each node can communicate with the other nodes in the cluster, consistency can be maintained. In some clusters, each node stores a copy of the cluster configuration data, and a cluster service synchronizes the data across nodes.

One problem arises when a network partition occurs thus preventing nodes from communicating. FIG. 1 (Prior Art) illustrates an example where a network partition 107 has occurred in a cluster 100 preventing a first partition of nodes (nodes 101-102) from communicating with a second partition of nodes (nodes 103-104). Shared storage 106 remains accessible to each node of the cluster; however, nodes in the first partition cannot communicate with nodes in the second partition. When such a split in the cluster occurs, it is necessary that only one partition continues functioning as a cluster to ensure that consistency is maintained.

To ensure that only one partition in a cluster continues executing (i.e. retains access to shared storage 106), the cluster service requires a partition to have quorum. In general, having quorum means that the partition comprises a majority of the elements in the cluster. Depending on the configuration of the cluster, elements can include the nodes of the cluster and possibly a disk (sometimes referred to as a disk witness) or a file share. Disk witnesses are used when an even number of nodes exist to prevent the situation where a tie would occur (e.g. if only the nodes were considered when determining majority).

In FIG. 1, both the first and the second partition have the same number of nodes. Accordingly, whichever partition has ownership of shared storage 106 will have quorum (i.e. 2 nodes+1 disk). When a node owns a disk, it has write access to the disk. Other nodes can also write to the disk, but the owner can control which nodes can have access. In this way, a single node is given control over who can access the disk. In FIG. 1, prior to the occurrence of network partition 107, node 101 has ownership of shared storage 106.

In general, an owner node allows access to nodes that it knows are members of the cluster and are within the owner node's partition (e.g. when a partition occurs). Therefore, when a partition occurs, the node that owns the disk is responsible for preventing nodes outside the majority from accessing shared storage. For example, in FIG. 1, node 101, as owner, would prevent nodes 103-104 from accessing shared storage 106 after network partition 107 occurs.

Disk ownership is commonly determined and managed using a SCSI protocol known as Persistent Reservation (PR). PR is a defense/challenge mechanism. In PR, each node has a unique key known as a registration key. To obtain ownership of a disk, a node must have registered its key, and then must obtain a reservation with the key.

FIG. 2A (Prior Art) illustrates two tables that are used in PR. FIG. 2A represents the state of the two tables when node 101 is the current owner of the disk (shared storage 106). Although two tables are shown in this example, PR can be implemented using a single table or other data structure to store similar information.

To have write access to a disk, a node must register its registration key. A node registers its key by adding it to registration table 201. For example, registration table 201 shows that nodes 101-104 have each registered their key. Accordingly, nodes 101-104 have write access to shared storage 106.

Once registered, a node can then attempt to reserve its key by adding it to reservation table 202. For example, reservation table 202 shows that node 101 has successfully reserved its key thereby making node 101 the owner of the disk. Once a node reserves its key, it can use its key to control the disk.

If, however, a reservation already exists when a node (referred to as a challenger) attempts to reserve its key, the reservation will fail. For example, because node 101's key is already reserved, any other node's attempt to reserve its key will fail. As part of this failed reservation, a challenger receives the current reservation key (e.g. node 101's key).

When a reservation already exists, a node must first preempt the reservation before it can reserve its own key. To enable an owner node (referred to as the defender) to defend its ownership of a disk, PR rules require a challenger to wait a specified time period (generally 6 seconds) after a reservation fails before issuing a preempt command. After this time period, the challenger awakes and issues a preempt command to attempt to remove the defender's key from the reservation table. The preempt command specifies the challenger's key as well as the current reservation key (the defender's key reserved in the reservation table that the challenger received when it failed reservation). For example, the preempt command specifies the key to remove from reservation table 202 (the defender's key), as well as the key to reserve in reservation table 202 (the challenger's key).

For the preempt command to succeed, the challenger's key must still be in registration table 201. To defend its ownership (i.e. to cause the challenger's preempt command to fail), the defender must remove the challenger's registration key from registration table 201 before the challenger issues a preempt command. Generally, every 3 seconds, the defender will awake and check reservation table 202 to determine whether any challenges have been made. Because the defender owns the disk, it can remove any other node's registration key from the registration table 201.

When node 101 sees node 104's key in registration table 201, node 101 will remove node 104's registration key from registration table 201. FIG. 2B (Prior Art) represents the state of the two tables after node 101 has defended against node 104's challenge. As shown, node 104's key is no longer listed in registration table 201.

Accordingly, when node 104 awakes and issues a preempt command, the preempt command will fail because the defender has already removed node 104's registration key. Because node 104's registration key has been removed from registration table 201, node 104 no longer has access to shared storage 106.

Because the defender sleeps for a shorter duration than the challenger, as long as the defender remains functional and has no reason to not defend its ownership, it will retain ownership by periodically removing the registration keys of any node challenging for ownership. However, if the defender fails or otherwise loses access to the disk, it will fail to remove the registration key of a challenger thereby allowing the challenger to successfully preempt ownership (i.e. remove the defender's keys from the registration and reservation table).

In addition to removing a challenger's registration key in a defense, a defender will also periodically remove the registration keys of any nodes that it does not recognize as being part of the active cluster. In other words, a node in a cluster is periodically updated regarding which nodes it can communicate with. If an owner node receives a notification that it cannot communicate with another node in the cluster (e.g. due to a network partition), the owner node will remove the other node's registration key to prevent the other node from accessing cluster storage.

Accordingly, in conventional PR, there are two general ways in which a node's registration key will be removed: (1) when the owner node receives notification that it cannot communicate with the node; and (2) when the node unsuccessfully challenges for ownership of the shared storage.

When a network partition occurs (i.e. when a node becomes aware that it cannot communicate with each node in the cluster), a node in a partition that does not have ownership of the disk generally will begin challenging for ownership of the disk. For example, in FIG. 1, after network partition 107 occurs, one or more of nodes 103-104 can commence a challenge to preempt node 101's ownership of shared storage 106 (because nodes 103 and 104 need ownership of shared storage 106 to obtain quorum (to thereby be able to continue functioning within the cluster).

In FIG. 1, network partition 107 does not prevent any of the nodes from accessing shared storage 106 (i.e. it only prevents nodes 101-102 from communicating with nodes 103-104). Accordingly, node 101 will continue to defend its ownership of shared storage 106 from node 103's or node 104's challenges.

If, however, node 101 were to fail or otherwise lose connection to shared storage 106 (or determine that it should not defend because it is not in a partition that could have quorum), challenges from node 103 or 104 would succeed (because node 101 would not be able to remove node 103's or node 104's registration keys). As a result, when the challenger (node 103 or node 104) awakes, its registration key will still be listed in registration table 201 thus allowing it to preempt node 101's ownership. The challenger will then take ownership of shared storage 106. As owner, the node will commence defending its ownership as described above (e.g. if node 101 or 102 commenced challenging for ownership).

The above example describes a cluster that provides the nodes and the storage with votes to determine ownership. Other voting schemes also exist which use the PR techniques described above. These schemes include node only voting (where only the nodes have a vote), and node+file share voting (where the nodes and a file share vote). Node only voting is commonly used when the cluster includes an odd number of nodes. Node+file share voting is similar to the node+storage voting described above, but is used when a file share is used for shared storage.

PR as described above functions correctly within many typical storage configurations. However, PR, as described above, is not always satisfactory when used in other types of storage configurations (e.g. when a cluster employs virtual disks as shared storage). In the Windows operating system, virtual disks are referred to as "Storage Spaces." In a Storage Space, multiple physical disks are aggregated into a storage pool. The storage pool can then be divided into one or more logical "Spaces" (or virtual disks). Each Space appears to applications as a physical storage device even though the Space is virtualized and may actually span many different physical storage devices.

For example, FIG. 3 (Prior Art) illustrates a cluster 300 that is similar to cluster 100 of FIG. 1 except that shared storage 106 has been replaced by storage pool 306. Storage pool 306 comprises three physical storage devices 310-312. From this pool, the user can create one or more Spaces. FIG. 3 shows that the user has created a single Space 307. Space 307 can be treated, from the perspective of applications on each node in the cluster, as a normal physical disk.

When Spaces are used, the nodes of the cluster need to have access to each physical disk in the underlying pool because the Spaces can be spread among the physical disks. For example, in cluster 300, data written to Space 307 could be physically stored on any of three physical storage devices in storage pool 306. When using Spaces, a single node owns the storage pool (meaning that the node owns each physical disk in the pool).

One particular problem caused by applying standard PR techniques with Spaces is that anytime a challenger attempts to preempt ownership of the pool from which the Spaces are created, the owner of the pool will remove the challenger's key thus causing any I/O to any Space from applications on the challenger to fail (because the challenger's key must be registered with a physical disk to enable the applications on the challenger to write to the physical disk).

Causing I/O from a challenger to fail may be an incorrect result of a challenge. For example, a challenger may be notified of a network partition prior to the defender. In response to the network partition, the challenger commences a challenge for the pool. If the challenger is in a partition that has quorum, the correct result would be for the challenger to win the challenge to take ownership of the pool (to thereby allow the challenger's partition to continue executing).

If, however, the defender has not been notified of the network partition (and accordingly, not notified that it is in a partition that does not have quorum), the defender will successfully defend its ownership of the pool. Using conventional PR techniques as described above, this defense includes removing the challenger's registration key so that any writes from the challenger will fail. The defender will continue to successfully defend its ownership until it receives notification of the network partition. Accordingly, until the defender receives notification of the network partition, the cluster will not commence operating properly on the partition with quorum (i.e. the challenger's partition). In other scenarios, the application of conventional PR techniques also leads to undesirable results.

BRIEF SUMMARY

The present invention extends to methods, systems, and computer program products for implementing persistent reservation techniques for establishing ownership of one or more physical disks. These persistent reservation techniques can be employed to determine ownership of physical disks in a storage pool as well as in any other storage configuration. Using the persistent reservation techniques of the present invention, when a network partition occurs, a defender of a physical disk does not remove a challenger's registration key until the defender receives notification that the challenger is no longer in the defender's partition. In this way, pending I/O from applications executing on the challenger will not fail due to the challenger's key being removed until the proper ownership of the physical disk can be resolved.

In one embodiment, a first node defends against another node's attempt to preempt the first node's persistent reservation on a storage device. After a network partition that prevents the first node from communicating with another node in the cluster, and prior to the first node being notified of the network partition, the first node detects that another node in the cluster has attempted to reserve the storage device shared by nodes of the cluster. The detection comprises identifying that the other node has changed the other node's registration key in a registration data structure.

The first node changes the first node's registration key, registers the changed registration key in the registration data structure, and reserves the changed registration key in a reservation data structure.

In another embodiment, a second node attempts to remove a first node's persistent reservation on a storage device so as to obtain a persistent reservation for the second node. The second node receives a notification that a network partition has occurred that prevents the second node from communicating with the first node.

The second node attempts to reserve the second node's registration key so as to obtain a persistent reservation on the storage device. The attempt to reserve includes the second node reading the registration key of the first node that is stored in a reservation data structure and storing the first node's key. The attempt to reserve also includes the second node changing the second node's registration key and registering the changed registration key. The attempt to reserve also includes the second node sleeping for a specified duration of time prior to issuing a preempt command to remove the first node's persistent reservation.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 4 illustrates another cluster of nodes which employs a plurality of virtual disks for shared storage.

FIG. 7 illustrates a flow chart of an example method for a first node to defend against another node's attempt to preempt the first node's persistent reservation on a storage device.

DETAILED DESCRIPTION

Figure 1:
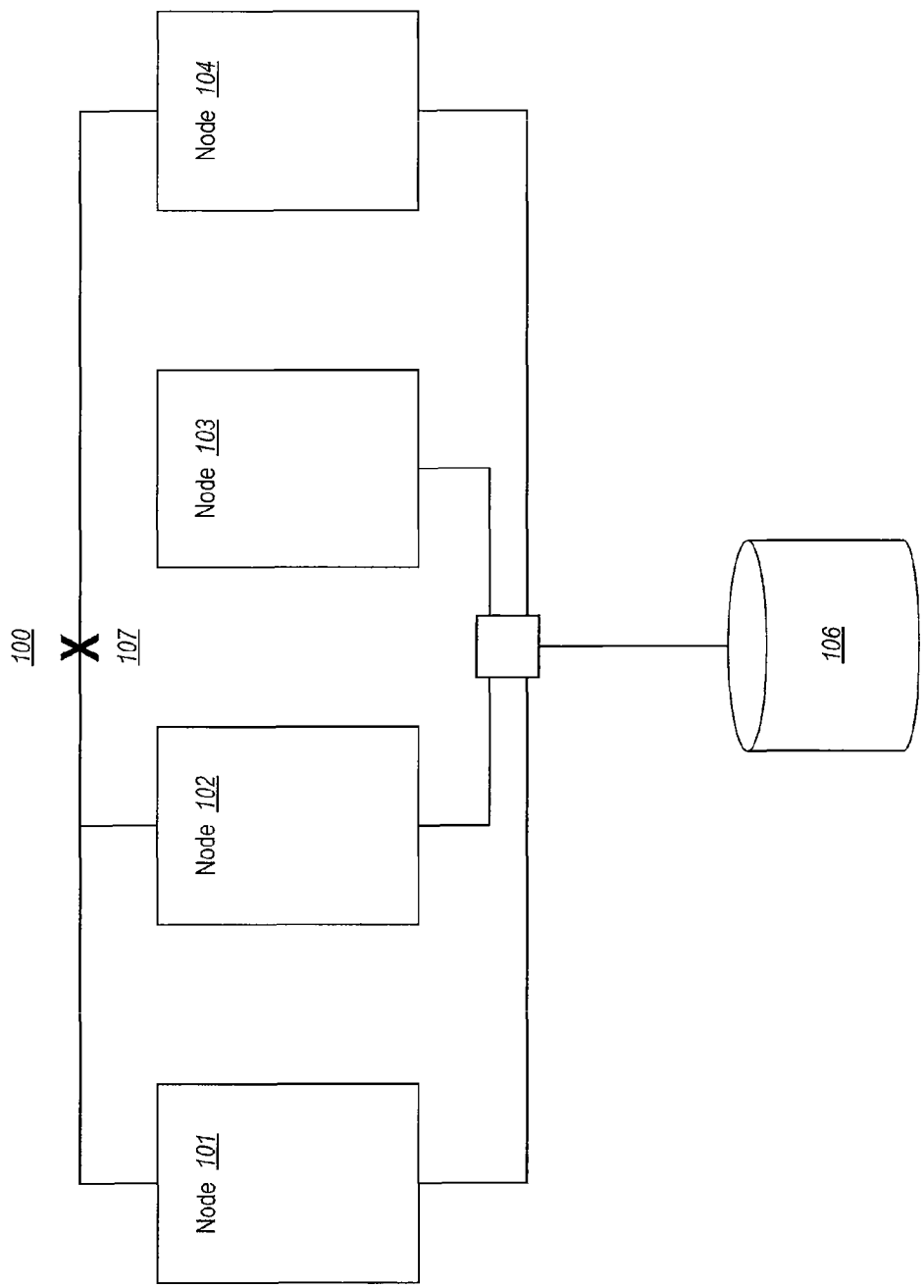
FIG. 1 illustrates a typical cluster of nodes in which convention persistent reservation techniques are used.
Figure 2A:
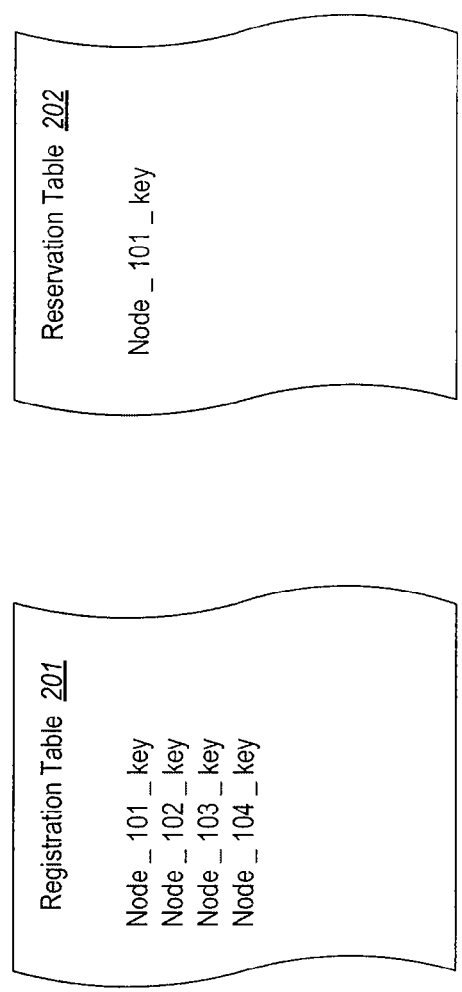
FIGS. 2A-2B illustrate exemplary tables used in implementing conventional persistent reservation.
Figure 2B:
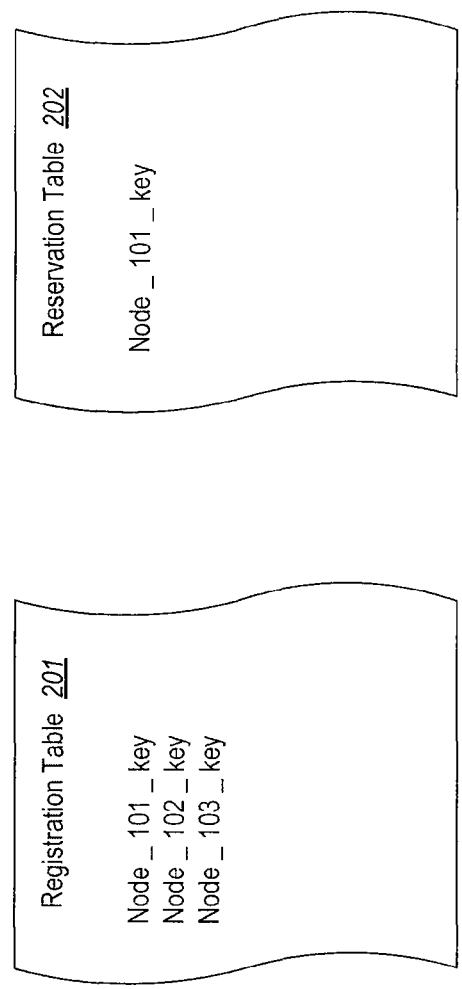
Figure 3:
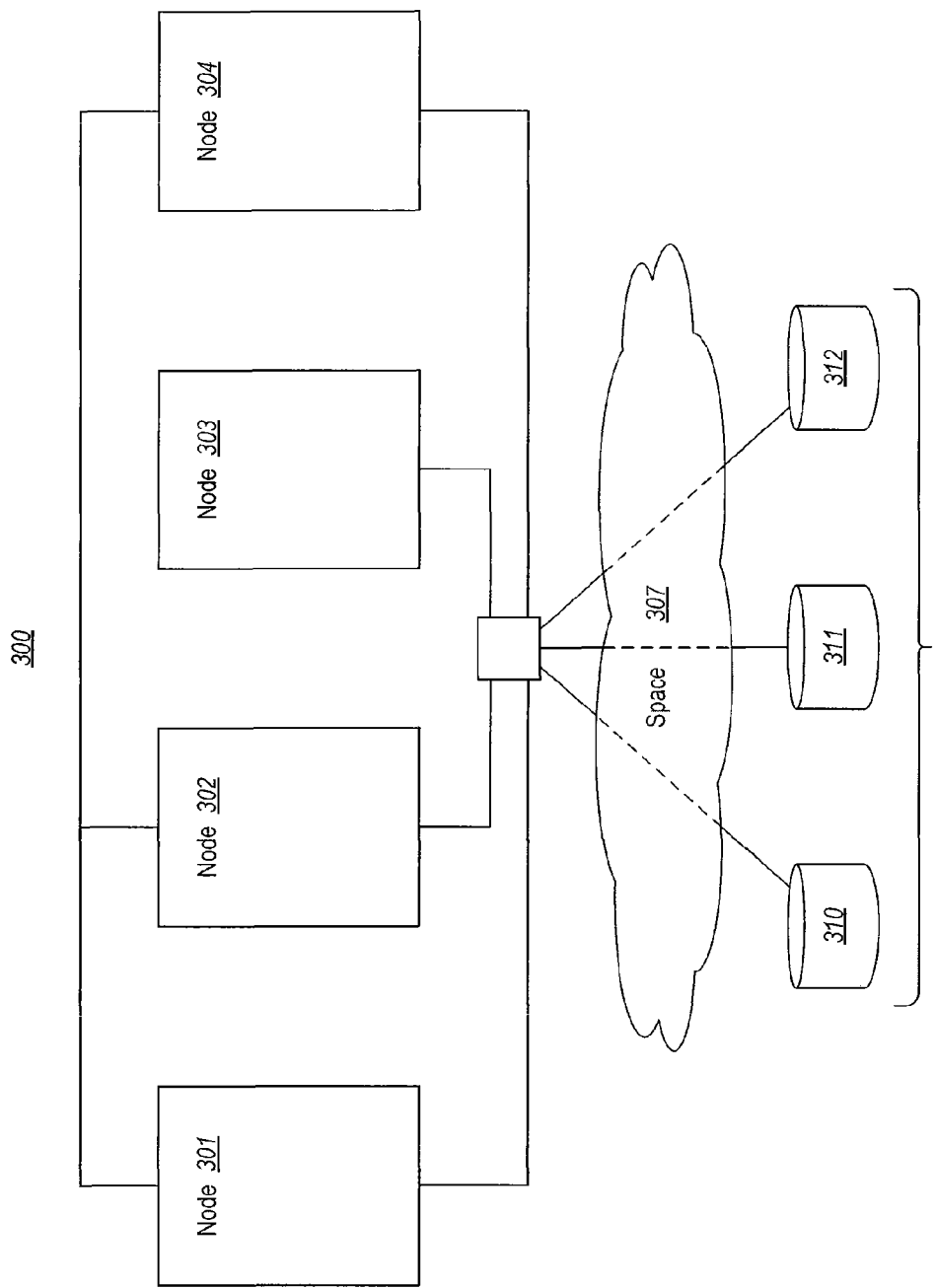
FIG. 3 illustrates a cluster of nodes which employs a virtual disk for shared storage.

The present invention extends to methods, systems, and computer program products for implementing persistent reservation techniques for establishing ownership of one or more physical disks. These persistent reservation techniques can be employed to determine ownership of physical disks in a storage pool as well as in any other storage configuration. Using the persistent reservation techniques of the present invention, when a network partition occurs, a defender of a physical disk does not remove a challenger's registration key until the defender receives notification that the challenger is no longer in the defender's partition. In this way, pending I/O from applications executing on the challenger will not fail due to the challenger's key being removed until the proper ownership of the physical disk can be resolved.

In one embodiment, a first node defends against another node's attempt to preempt the first node's persistent reservation on a storage device. After a network partition that prevents the first node from communicating with another node in the cluster, and prior to the first node being notified of the network partition, the first node detects that another node in the cluster has attempted to reserve the storage device shared by nodes of the cluster. The detection comprises identifying that the other node has changed the other node's registration key in a registration data structure.

The first node changes the first node's registration key, registers the changed registration key in the registration data structure, and reserves the changed registration key in a reservation data structure.

In another embodiment, a second node attempts to remove a first node's persistent reservation on a storage device so as to obtain a persistent reservation for the second node. The second node receives a notification that a network partition has occurred that prevents the second node from communicating with the first node.

The second node attempts to reserve the second node's registration key so as to obtain a persistent reservation on the storage device. The attempt to reserve includes the second node reading the registration key of the first node that is stored in a reservation data structure and storing the first node's key. The attempt to reserve also includes the second node changing the second node's registration key and registering the changed registration key. The attempt to reserve also includes the second node sleeping for a specified duration of time prior to issuing a preempt command to remove the first node's persistent reservation.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, embodiments of the invention can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that computer storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Although the present invention is described as being implemented in cluster 400 shown in FIG. 4, it is to be understood that the PR techniques can also be implemented in other computer architectures that include multiple nodes. Cluster 400 includes four interconnected nodes (nodes 401-404). Each node is connected to each of storage devices 410-412. Storage devices 410-412 comprise storage pool 420 from which multiple virtual disks (or Spaces) 430a-430n have been created. Accordingly, applications on each node can access each of virtual disks 430a-430n. It is assumed that quorum in cluster 400 is determined using a nodes+storage voting scheme. Accordingly, each of nodes 401-404 and pool 420 has a vote. A single node owns each storage device in pool 420 at a given time.

Additionally, FIGS. 5A-5F illustrate various states of a registration table 501 and a reservation table 502 that can be maintained to implement the PR techniques of the present invention. A separate set of registration and reservation tables is maintained for each of storage devices 410-412. In the following description, it will be assumed that registration table 501 and reservation table 502 pertain to storage device 410, but it should be understood that a similar process would be followed for determining ownership of each storage device. Also, even though two tables are shown, the present invention can be implemented using a single table or any number of other data structures. Accordingly, the data structure used to store the keys is not essential to the invention.

FIGS. 5A-5F also include nodes 401 and 404 to illustrate how the nodes store currently reserved keys during the PR process of the present invention. Of course, although not shown, each node also stores its registration key.

Figure 5A:
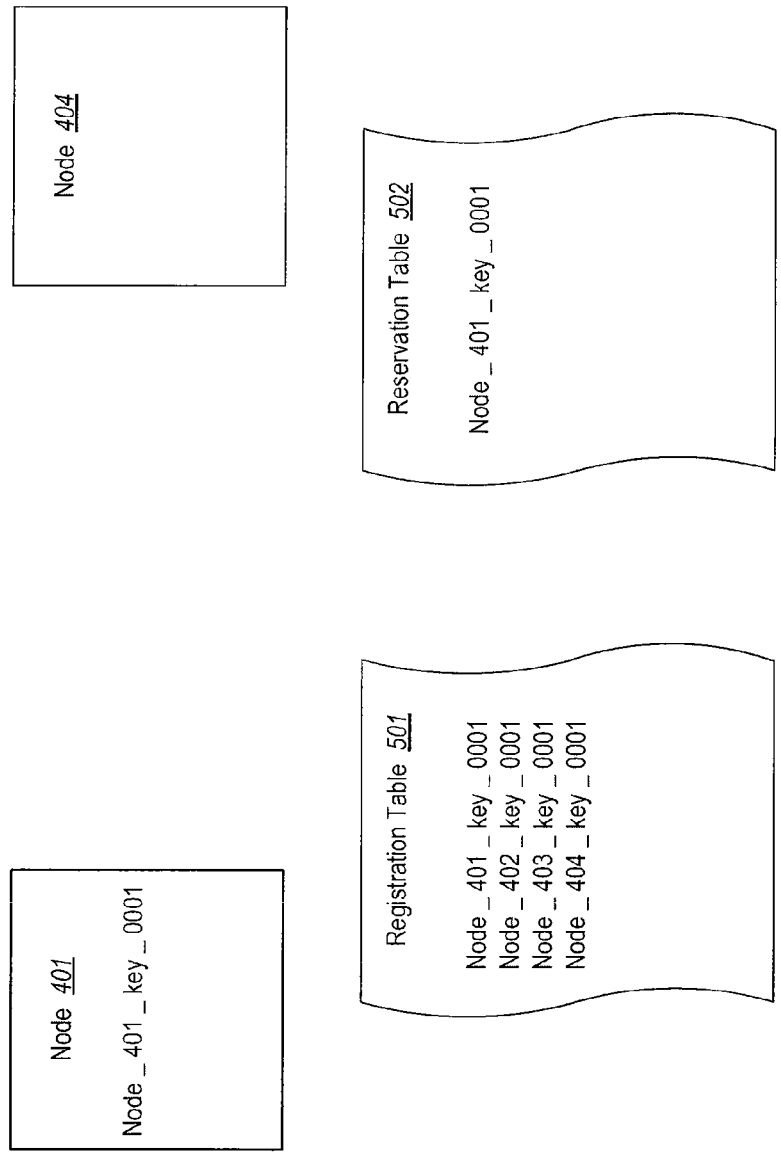
FIGS. 5A-5F illustrate exemplary tables used in implementing the persistent reservation techniques of the present invention.

FIG. 5A represents the state of the two tables prior to the occurrence of network partition 405. In FIG. 5A, registration table 501 includes four registration keys, one for each of nodes 401-404 indicating that each node in the cluster can write to storage device 410. Reservation table 502 also includes node 401's registration key indicating that node 401 has a reservation on storage device 410 (i.e. node 401 is the current owner of the physical disk).

When network partition 405 occurs, each node in the cluster will be notified of the partition. However, each node will not necessarily be notified at the same time. In this example, node 404 has been notified of network partition 405 and accordingly has commenced a challenge for ownership of each storage device in pool 420 (because node 404's partition needs ownership of pool 420 to have quorum).

Node 401, however, at the time of node 404's challenge has yet to be notified of network partition 405. As such, node 401 will think that it is still in the same partition as node 404. In conventional PR, when node 404 challenges for ownership of storage device 410, the fact that node 401 still thinks that node 404 is in the same partition would not matter, and node 401 would remove node 404's registration key from registration table 501 thus causing I/O from node 404 to fail.

In contrast, in the present invention, different PR techniques are applied to ensure that node 401 does not remove node 404's registration key until node 401 knows that node 404 is no longer in the same partition. FIGS. 5B-5E illustrates how the PR techniques of the present invention are implemented.

Figure 5B:
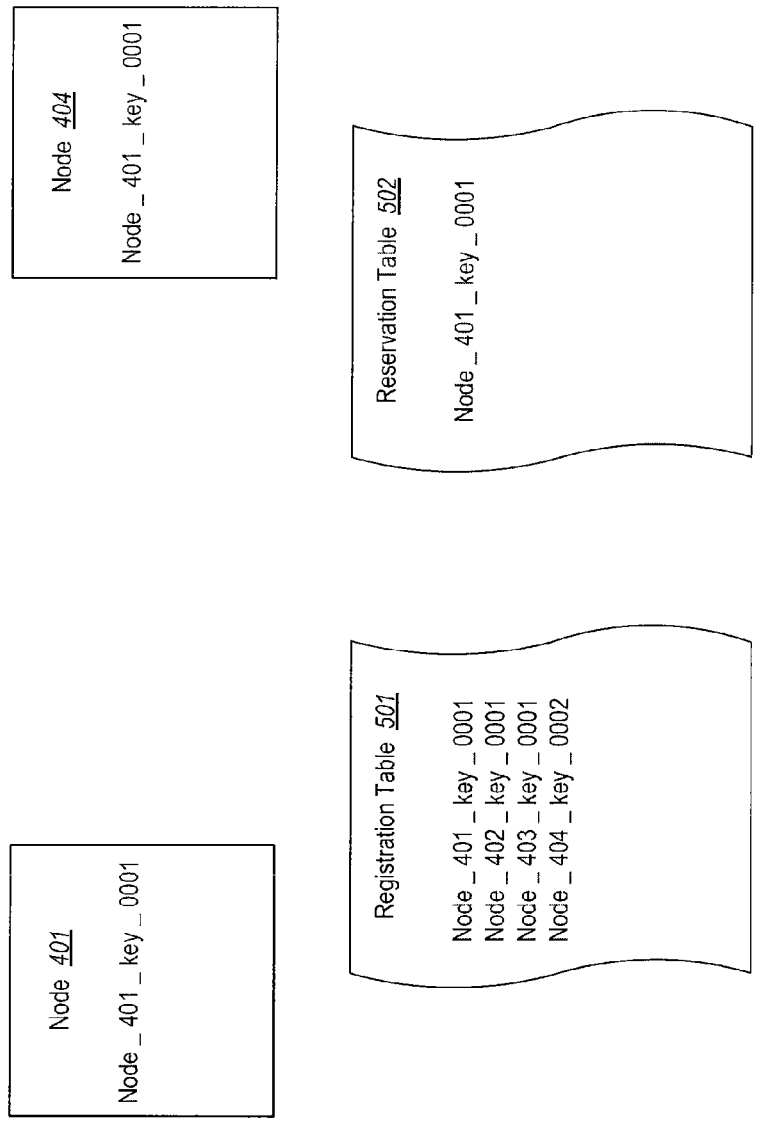

FIG. 5B represents the state of the two tables after node 404 has commenced a challenge for ownership of storage device 410. Accordingly, FIG. 5B can represent the time period while node 404 is asleep and node 401 has not yet awakened to defend its ownership.

Node 404 attempts to reserve by performing the following tasks. Node 404 increments (or otherwise changes) its own registration key and registers it in registration table 501 (in place of its old registration key). However, because node 401 is the current owner, node 404's attempt to reserve will initially fail thus requiring node 404 to sleep before attempting to preempt node 401's reservation. Because the reservation failed, node 404 also reads the current reservation key (node 401's key in reservation table 502) and stores it.

Accordingly, FIG. 5B, shows that registration table 501 has been changed by replacing node 404's old registration key with node 404's incremented registration key. In FIG. 5B, node 404 is shown as storing the current reservation key, node 401's registration key.

Figure 5C:
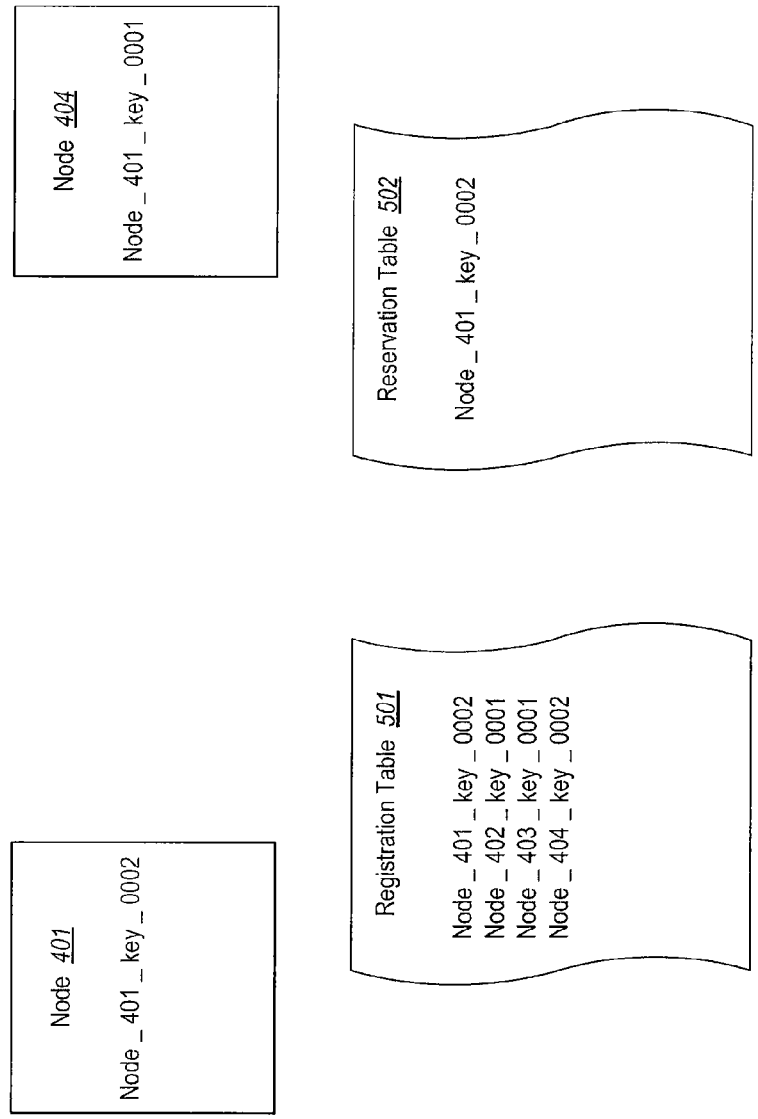

FIG. 5C represents the state of the two tables after node 401 has awakened to defend its ownership, but prior to node 401 being notified of network partition 405. In a defense, a node removes the registration keys of any nodes that are not recognized as being part of the owner node's partition. Accordingly, when node 401 sees node 404's incremented registration key in registration table 501, node 401 will not remove node 404's registration key because node 401 still believes node 404 is in the same partition.

Rather than remove node 404's registration key from registration table 501 (thus preventing node 404 from writing to storage device 410), node 401 instead increments its own registration key, registers the incremented key, and reserves the incremented key. This is the owner node's form of defense when a node that is not known to be in a different partition challenges for ownership.

Accordingly, FIG. 5C shows that registration table 501 and reservation table 502 now each include node 401's incremented registration key in place of node 401's previous key. In short, because node 401 does not yet know that node 401 and node 404 are no longer in the same partition, node 401's response to node 404's challenge involves incrementing and reserving its registration key rather than removing node 404's registration key from registration table 501.

Figure 5D:
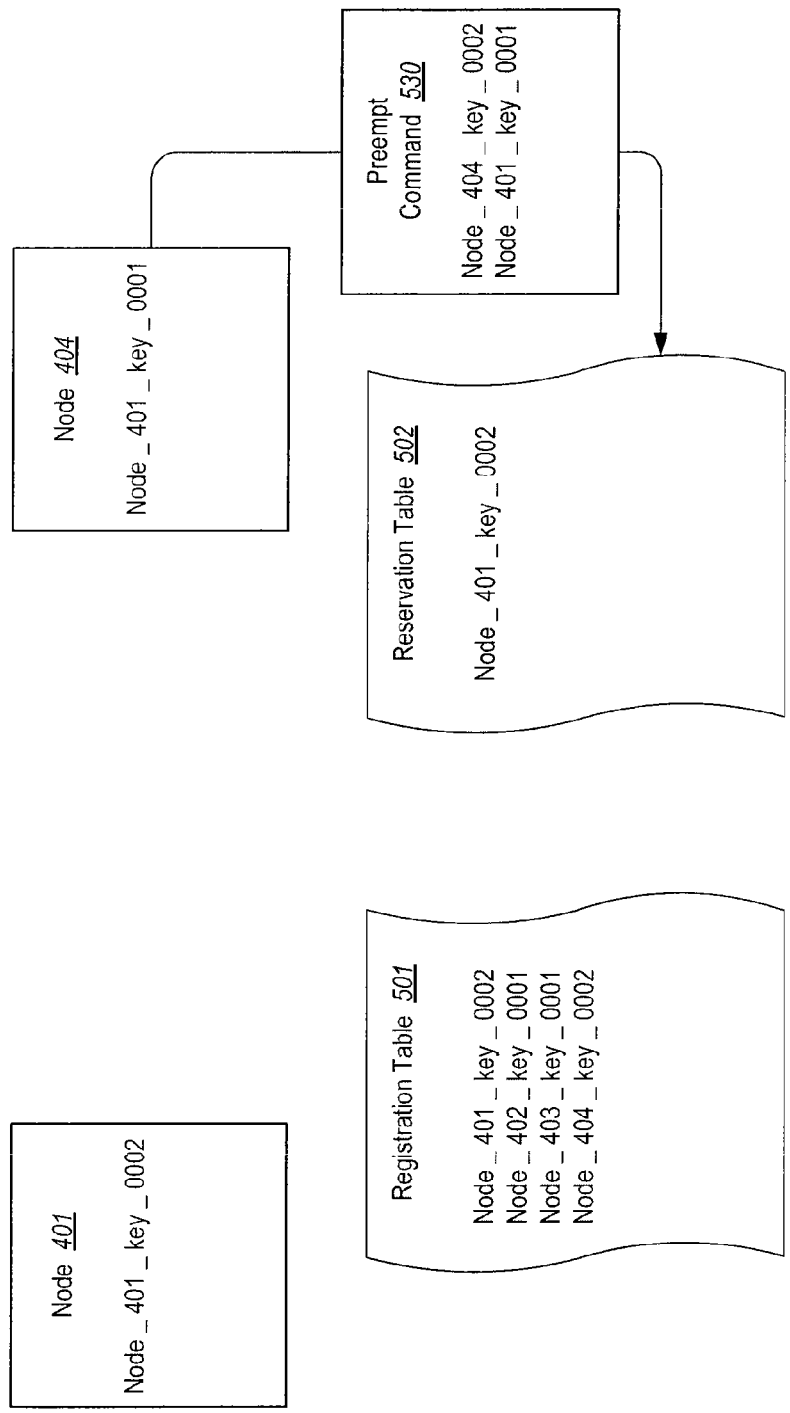

FIG. 5D represents the state of the two tables after node 404 has awakened and issued preempt command 530. Preempt command 530 includes node 404's current registration key and the reservation key that node 404 read prior to sleeping. Because node 401 has incremented its registration key and reserved the incremented key, the reservation key held by node 404 will not match the current reservation key stored in reservation table 502 (Node_401_key_0001 !=Node_401_key_0002). Thus, node 404's preemption attempt will fail, and node 401 will remain owner of storage device 410. FIG. 5D accordingly shows that both tables remain the same as in FIG. 5C because node 401 has remained owner but has not removed node 404's registration.

Figure 5E:
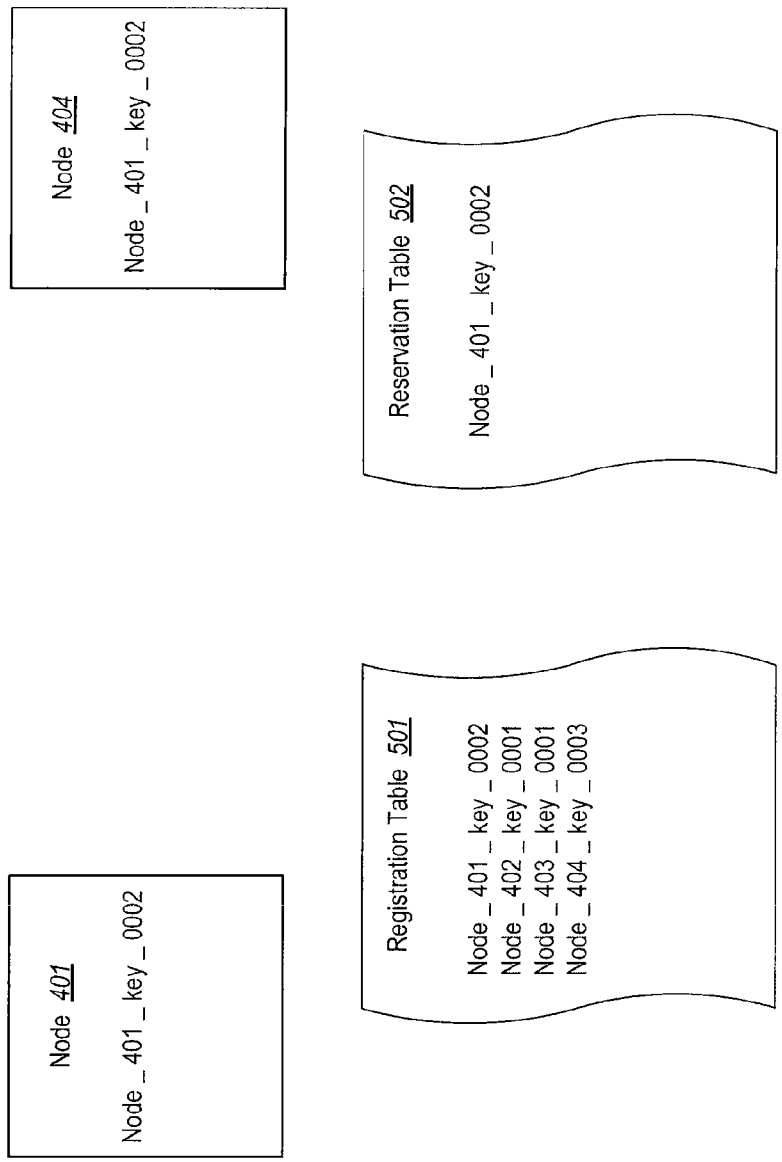

At some later time, node 404 (or similarly, node 403) can commence another challenge in the manner described with respect to FIGS. 5A-5B. FIG. 5E represents the state of the two tables after node 404 has commenced another challenge. As shown, registration table 501 now includes node 404's incremented key (Node_404_key_0003). Node 404 has also stored the current reservation key (Node_401_key_0002).

Prior to node 401 awakening to defend its ownership, node 401 has been notified of network partition 405. Accordingly, node 401 responds differently to node 404's challenge. In particular, node 401 now knows that node 404 is not in the same partition, and as such, node 401 removes node 404's registration key from registration table 501 causing node 404's challenge to fail as well as preventing node 404 from writing to storage device 410.

Figure 5F:
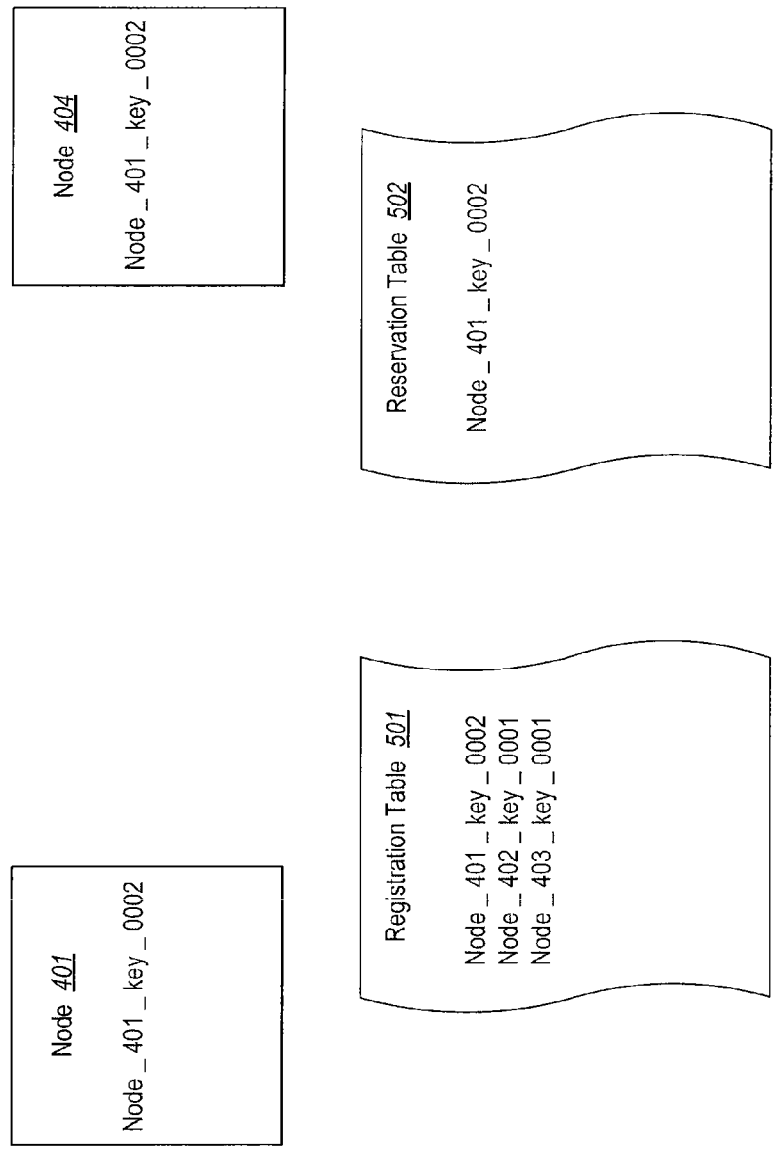

FIG. 5F, therefore, represents the state of the two tables after node 401 has been notified of network partition 405 and after node 401 has defended against node 404's challenge. As shown, registration table 501 does not include node 404's registration key. Although node 404 is shown as still storing the current reservation key, a preemption attempt by node 404 would fail because node 404's registration key is not in registration table 501.

Although the above description uses the example of incrementing a key, the present invention can also be implemented by changing a key in any other way to notify another node of a challenge. For example, rather than increment its key, node 404 could change a bit. In essence, the changing of the registration key acts as a way for the nodes to continue communicating even though the network partition has prevented the nodes from directly communicating. Accordingly, any means of modifying the registration key to communicate a node's challenge can be used in the present invention.

It is noted that node 404's registration key may also be removed even without node 404 commencing a challenge. Any time node 401 awakes to defend ownership, it first checks for any registration keys of nodes it does not recognize as being part of the same partition. For example, if node 401 awakes after network partition 405 and prior to node 404 commencing a challenge, node 401 will remove node 404's key (as well as node 403's key) from registration table 501 because node 404 and 403 are no longer in the same partition.

Accordingly, an owner node does not remove another node's registration key until the owner node knows that the other node is not in the same partition as the owner node. In this way, an owner node will not remove another node's key when a network partition occurs until the owner node knows about the network partition and can respond accordingly (e.g. by defending or not defending its ownership).

Of course, during any given defense, the owner node can both remove registration keys of any node it does not recognize as being part of the same partition, as well as increment, register, and reserve its registration key in response to a challenge from a node that it does not yet know is in another partition. Using the same example of FIGS. 5A-5F, if node 403 and 404 challenged at the same time, but node 401 had only been notified that node 404 was no longer in the same partition, node 401 would remove node 404's key, while leaving node 403's key and incrementing its own key.

Similarly, if at any time, node 401 became aware that it was in a partition that did not have quorum (e.g. if network partition 405 separated node 401 from nodes 402-404), node 401 would not defend its ownership thus allowing one of the nodes in the other partition to successfully preempt node 401's ownership.

As mentioned above, the process described with respect to FIGS. 5A-5F is performed for every storage device in a storage pool. For example, node 404 would challenge for ownership of storage devices 411 and 412 in the same manner. A single node, however, should generally have ownership of every storage device in the pool. To ensure that a single node obtains and retains ownership of each storage device, the process described above is carried out on each storage device is a predefined order.

In other words, each node knows of an order in which each storage device should be challenged for. This order can be determined, for example, based on an identifier associated with the storage device (e.g. a pool guide). For example, when node 404 awakes to issue preempt commands, it can issue the preempt commands in a specified order (such as by preempting on storage device 410, then storage device 411, then storage device 412).

If any preempt command fails, the challenging node will cease challenging for ownership. For example, if node 404's preempt command failed on storage device 410, node 404 would not attempt to preempt ownership of storage devices 411 and 412. By issuing preempt commands in a specified order, the situation can be avoided where one node wins ownership of some storage devices in the pool, while one or more other nodes win ownership of other storage devices in the pool.

In addition to ensuring that an owner node or challenger node is part of a partition that has quorum (or could have quorum by obtaining ownership of the pool), a node can also verify that a quorum of disks in the pool are accessible prior to commencing a defense of or challenge for the storage devices of the pool. For example, when node 401 awakes to defend its ownership, it can first enumerate all storage devices in pool 420. If the number of enumerated storage devices is less than a majority of the storage devices in the pool (e.g. less than 2 of storage devices 410-412), node 401 can cease its defense. Similarly, when node 404 attempts a challenge, it can also enumerate the storage devices and cease the challenge if a quorum of the storage devices is not accessible. A storage device may be inaccessible if the storage device fails or otherwise stops operating correctly.

Figure 6:
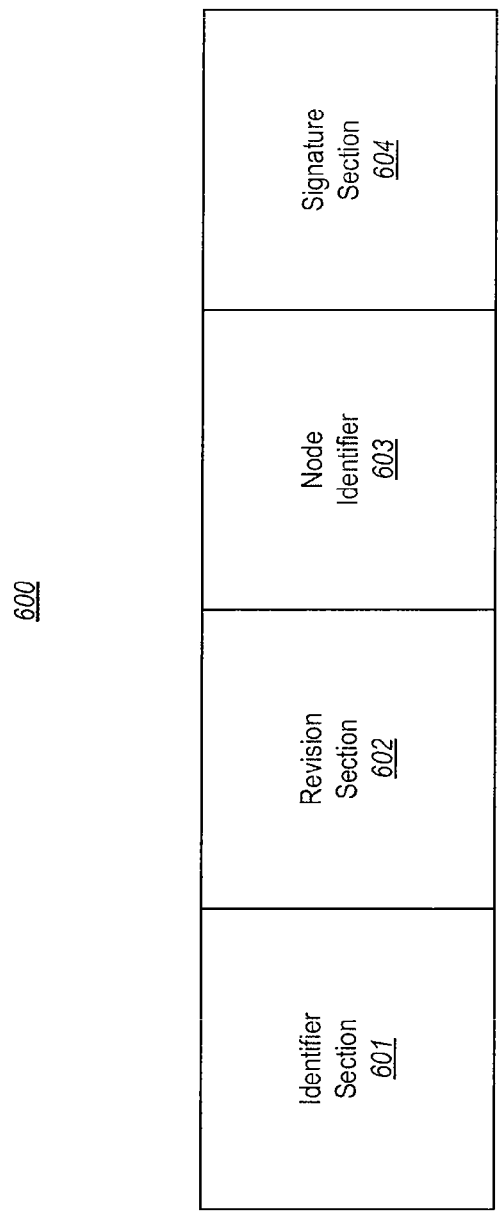
FIG. 6 illustrates an exemplary format of a registration key that can be used for persistent reservation according to the present invention.

FIG. 6 illustrates an exemplary format for a registration key 600. Registration key 600 includes four sections: an identifier section 601, a revision section 602, a node identifier section 603, and a signature section 604. Identifier section 601 includes an identifier of the storage device for which the registration key is used. Revision section 602 is the portion of the key that is incremented as described above. Node identifier section 603 includes an identifier of the node to which the key pertains. Signature portion 604 includes a unique signature generated by the corresponding node.

FIG. 7 illustrates a flow chart of an example method 700 for a first node to defend against another node's attempt to preempt the first node's persistent reservation on a storage device. Method 700 will be described with respect to FIGS. 4 and 5A-5F.

Method 700 includes an act 701 of, after a network partition that prevents the first node from communicating with another node in the cluster, and prior to the first node being notified of the network partition, the first node detecting that another node in the cluster has attempted to reserve the storage device shared by nodes of the cluster. The detection comprises identifying that the other node has changed the other node's registration key in a registration data structure. For example, node 401 can detect that node 404 has changed its registration key in registration table 501 pertaining to storage device 410 while node 401 has a persistent reservation on storage device 410.

Method 700 includes an act 702 of, the first node changing the first node's registration key, registering the changed registration key in the registration data structure, and reserving the changed registration key in the reservation data structure. For example, node 401 can change (e.g. increment) its registration key, register the changed registration key in registration table 501, and reserve the changed registration key in reservation table 502.

Figure 8:
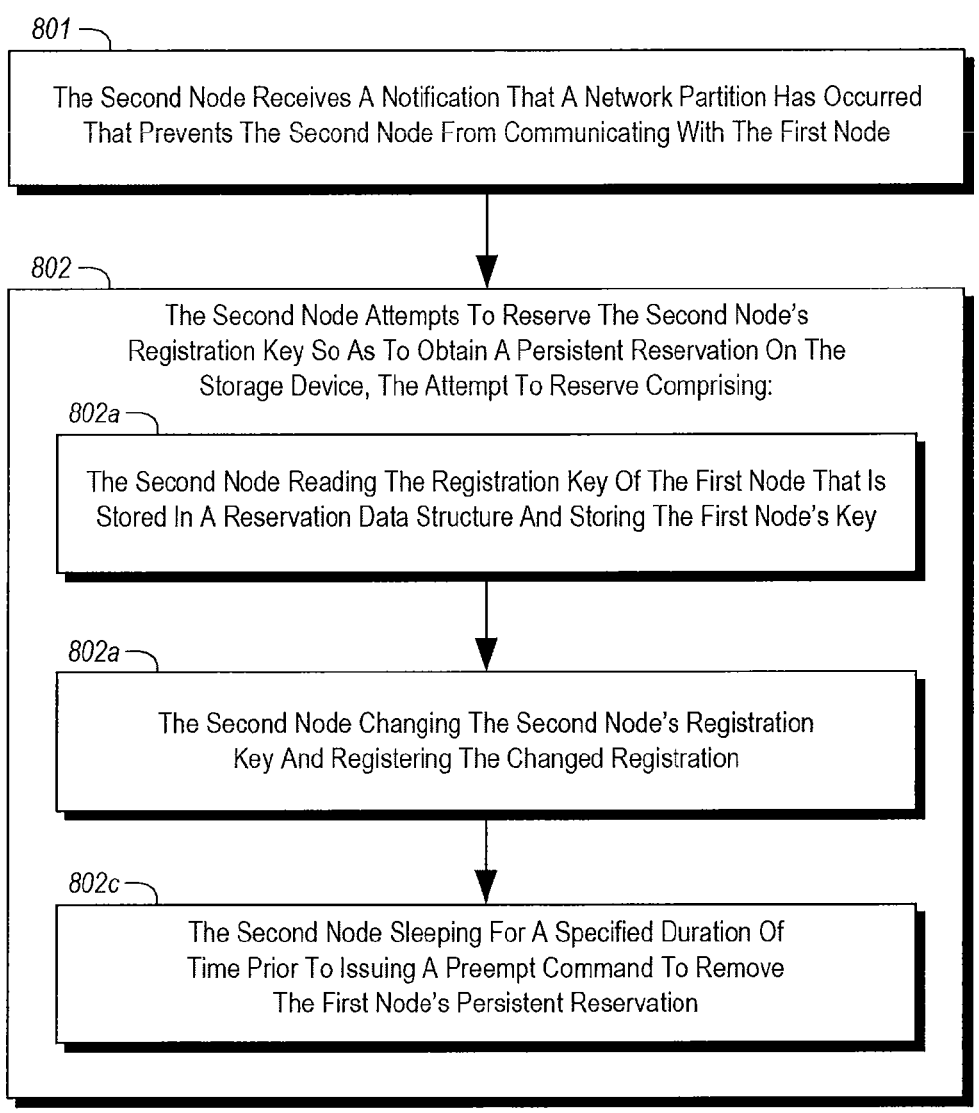
FIG. 8 illustrates a flow chart of an example method for a second node to attempt to remove a first node's persistent reservation on a storage device so as to obtain a persistent reservation for the second node.

FIG. 8 illustrates a flow chart of an example method 800 for a second node to attempt to remove a first node's persistent reservation on a storage device so as to obtain a persistent reservation for the second node. Method 800 will be described with respect to FIGS. 4 and 5A-5F.

Method 800 includes an act 801 of the second node receiving a notification that a network partition has occurred that prevents the second node from communicating with the first node. For example, node 404 can receive notification that network partition 405 has occurred.

Method 800 includes an act 802 of the second node attempting to reserve the second node's registration key so as to obtain a persistent reservation on the storage device. Act 802 includes sub-acts 802a-802c.

Sub-act 802a includes the second node reading the registration key of the first node that is stored in a reservation data structure and storing the first node's key. For example, node 404 can read node 401's registration key in reservation table 502.

Sub-act 802b includes the second node changing the second node's registration key and registering the changed registration key. For example, node 404 can change its registration key and register the changed registration key in registration table 501.

Sub-act 802c includes the second node sleeping for a specified duration of time prior to issuing a preempt command to remove the first node's persistent reservation. For example, node 404 can sleep for at least twice the duration as the defender node sleeps (e.g. six seconds if the node 401 sleeps for three seconds) prior to awaking and issuing a preempt command to remove node 401's reservation on storage device 410.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. At a first node of a cluster, the first node owning a persistent reservation on a storage device shared by nodes of the cluster, a method for the first node to defend against another node's attempt to preempt the first node's persistent reservation, the method comprising:

after a network partition that prevents the first node from communicating with another node in the cluster, and prior to the first node being notified of the network partition, the first node detecting that another node comprising a challenger node in the cluster has attempted to reserve the storage device shared by nodes of the cluster, the detection comprising identifying that the challenger node has changed the challenger node's registration key in a registration data structure; and the first node changing the first node's registration key which was registered in the registration structure to a new registration key that the challenger node is unaware of, registering the new registration key in the registration data structure, and reserving the new registration key in a reservation data structure rather than removing any registration key associated with the challenger node from the registration data structure prior to being notified of the network partition.

2. The method of claim 1, further comprising:
the first node receiving notification of the network partition; and
the first node removing the challenger node's registration key from the registration data structure to prevent the challenger node from accessing the storage device.

3. The method of claim 2, further comprising:
prior to removing the challenger node's registration key, the first node determining that the first node is part of a partition that has quorum.

4. The method of claim 1, further comprising:
the first node receiving notification of the network partition;
the first node determining that the first node is part of a partition that does not have quorum; and
the first node failing to defend against another node's attempt to preempt the first node's persistent reservation.

5. The method of claim 1, wherein the first and challenger node's new registration key comprises an incremented version of the first and challenger node's registration key respectively.

6. The method of claim 1, wherein the registration data structure and the reservation data structure are either the same data structure or separate data structures.

7. The method of claim 1, further comprising:
after the first node changes, registers, and reserves the first node's registration key, the first node sleeping for a specified duration prior to awaking to defend the first node's persistent reservation.

8. The method of claim 7, further comprising:
prior to the first node being notified of the network partition, the first node awaking to defend the first node's persistent reservation;
the first detecting that the challenger node has again challenged for ownership of the storage device, the detection comprising identifying that the challenger node has again changed the challenger node's registration key in the registration data structure; and
the first node again changing the first node's registration key, registering the changed registration key in the registration data structure, and reserving the changed registration key in the reservation data structure.

9. The method of claim 7, further comprising:
after the first node is notified of the network partition, the first node awaking to defend the first node's persistent reservation; and
the first node removing the other node's registration key from the registration data structure to prevent the challenger node from accessing the storage device.

10. The method of claim 1, wherein the storage device is part of a storage pool that includes a plurality of storage devices.

11. The method of claim 10, further comprising:
the first node enumerating all storage devices in the pool that are accessible; and
failing to defend the first node's persistent reservation if the number of accessible storage devices is less than a majority of the storage devices in the pool.

12. At a second node of a cluster, the cluster sharing a storage device for which a first node in the cluster has a persistent reservation, a method for the second node to attempt to remove the first node's persistent reservation so as to obtain a persistent reservation for the second node, the method comprising:

the second node receiving a notification that a network partition has occurred that prevents the second node from communicating with the first node; and the second node attempting to reserve the second node's registration key so as to obtain a persistent reservation on the storage device, the attempt to reserve comprising:

the second node reading the registration key of the first node that is stored in a reservation data structure and storing the first node's registration key;

the second node changing the second node's registration key in a registration data structure and registering the changed registration key in the registration data structure; and the second node sleeping for a specified duration of time prior to issuing a preempt command to remove the first node's registration key from the reservation data structure.

13. The method of claim 12, further comprising:
the second node awaking after the specified duration of time;
the second node issuing a preempt command to attempt to remove the first node's persistent reservation, the preempt command including the second node's changed registration key, and the first node's registration key that was read from the reservation data structure; and
the second node receiving notification that the preempt command has failed because the first node has changed the first node's registration key such that the first node's registration key in the preempt command does not match the current changed version of the first node's registration key that is reserved in the reservation data structure.

14. The method of claim 12, further comprising:
the second node awaking after the specified duration of time;
the second node issuing a preempt command to attempt to remove the first node's persistent reservation, the preempt command including the second node's changed registration key, and the first node's registration key that was read from the reservation data structure; and
the second node receiving notification that the preempt command has succeeded because the second node's changed registration key is included in the registration data structure and the first node's registration key in the preempt command matches the first node's registration key in the reservation data structure.

15. The method of claim 12, wherein the storage device is part of a storage pool that includes a plurality of storage devices.

16. The method of claim 15, further comprising:
the second node awaking after the specified duration of time;
the second node enumerating all storage devices in the pool that are accessible; and
the second node failing to issue a preempt command if the number of accessible storage devices is less than a majority of the storage devices in the pool.

17. The method of claim 15, further comprising:
the second node awaking after the specified duration of time;
the second node issuing a preempt command on each storage device in the pool in a specified order.

18. The method of claim 17, further comprising:
if any preempt command fails, the second node ceasing to issue preempt commands on any further storage devices in the pool.

19. The method of claim 12, further comprising:
prior to the second node attempting to reserve the second node's registration key, the second node determining that the second node is in a partition that has quorum, or that would have quorum if the second node obtained a persistent reservation on the storage device.

20. A cluster of nodes comprising:
a first node that owns a persistent reservation on each of a plurality of storage devices in a pool of storage devices shared by the nodes of the cluster, the first node performing the following to defend its persistent reservation on each storage device in the pool:
  after a network partition that prevents the first node from communicating with a second node in the cluster, and prior to the first node being notified of the network partition, detecting that the second node in the cluster comprising a challenger node intends to take ownership of each storage device in the pool, the detection comprising identifying that the challenger node has added an incremented version of the challenger node's registration key to a registration data structure for each storage device; and
  for each storage device, changing the first node's registration key which was registered in the registration structure to a new registration key that the challenger node is unaware of, registering the incremented registration key in the registration data structure, and reserving the incremented registration key in a reservation data structure;
the challenger node that performs the following to attempt to obtain a persistent reservation on each storage device in the pool upon being notified of the network partition:
  for each storage device, reading the registration key of the first node that is stored in the reservation data structure and storing the first node's registration key;
  for each storage device, incrementing the second node's registration key in the registration data structure, and registering the incremented registration key in the registration data structure; and
  sleeping for a specified duration of time prior to issuing a preempt command on each of the storage devices to attempt to preempt the first registration key from the reservation data structure on each storage device.

* * * * *